United States Patent [19]

Watanabe

[11] 4,390,917
[45] Jun. 28, 1983

[54] DEVICE FOR DETECTING EDGE OF MAGNETIC TAPE FOR RECORDING SIGNALS

[75] Inventor: Seizo Watanabe, Hachioji, Japan

[73] Assignee: Olympus Optical Co., Ltd., Tokyo, Japan

[21] Appl. No.: 169,657

[22] Filed: Jul. 17, 1980

[30] Foreign Application Priority Data

Jul. 24, 1979 [JP] Japan .................................. 54/93901
Jul. 24, 1979 [JP] Japan .......................... 54/101952[U]
Jul. 24, 1979 [JP] Japan .......................... 54/101953[U]

[51] Int. Cl.³ .................... G11B 21/08; G11B 5/12; G11B 15/48; G11B 5/02
[52] U.S. Cl. .................................... 360/128; 360/20; 360/74.7; 360/78
[58] Field of Search ............... 360/73, 96.2, 128, 130, 360/90, 106, 107, 108, 109, 74.6, 74.7, 78; 226/3, 20

[56] References Cited

U.S. PATENT DOCUMENTS

| | | | |
|---|---|---|---|
| 2,566,399 | 9/1951 | Bishop | 226/20 |
| 3,564,157 | 2/1971 | Kato | 360/78 |
| 3,604,847 | 9/1971 | Ganske | 360/106 |
| 3,645,538 | 2/1972 | Zimmermann | 360/78 |
| 3,676,609 | 7/1972 | Coyle | 360/78 |
| 3,800,316 | 3/1974 | Kuharchuk | 360/74.7 |
| 3,967,068 | 6/1976 | Shinohara | 360/106 |
| 4,049,213 | 9/1977 | Hank | 226/20 |
| 4,054,927 | 10/1977 | Zimmermann | 360/74.6 |

Primary Examiner—Robert M. Kilgore

[57] ABSTRACT

First and second contact members insulated from and bonded to the respective upper and lower surfaces of a magnetic head which is mounted on an operating member driven from a pulse motor are adapted to get out of the edge of a magnetic tape when the magnetic head is brought to positions corresponding to the uppermost and lowermost tracks respectively. When these contact members get out of the edge of the magnetic tape, they come to contact with a stationary contact member which is provided on the side of the magnetic tape opposite the contact members.

10 Claims, 9 Drawing Figures

DEVICE FOR DETECTING EDGE OF MAGNETIC TAPE FOR RECORDING SIGNALS

BACKGROUND OF THE INVENTION

This invention relates to a signal recording and reproducing system of the type, in which a recording/reproducing head is moved stepwise in the direction of width of a single recording tape for tracing successive recording tracks arranged in the direction of the tape width in recording or playback, and, more particularly, to a device for detecting the edge of the signal recording tape, that is, for detecting the fact that the head is brought to either edge of the tape, to thereby control the movement of the head.

In the afore-mentioned recording and reproducing system, for instance a video tape recorder of a stationary head type, the head is fed stepwise in the direction of the width of an endless tape by a predetermined small pitch corresponding to the recording track pitch of the tape every time the endless tape completes one excursion. In this type of video tape recorder, when the head is brought to either edge of the endless tape, i.e., brought to a position corresponding to the end track in the tape, it is necessary to stop the endless tape or return the head in the reverse direction by detecting this. To this end, it has been proposed to provide a microswitch at a position corresponding to the edge of the tape such that an actuator of this microswitch can be actuated by the head. With this microswitch, however, the position of the actuator when the switch is turned on is different from the position when the switch is turned off, that is, the microswitch has a peculiar hysteresis involved in its on-off operation. Therefore, for ensuring reliable on-off operation of the microswitch it is necessary to give a displacement stroke greater than the afore-mentioned hysteresis to the actuator of the microswitch. This means that an extra distance has to be provided for the movement of the head between adjacent recording tracks, that is, the track pitch has to be increased, in order to provide for the afore-mentioned displacement stroke of the microswitch actuator. To increase the track pitch, however, is very undesirable for the video tape recorder, which is small in size and has to meet the demand for recording and reproduction of high quality images.

SUMMARY OF THE INVENTION

An object of the invention, accordingly, is to provide a device for detecting the edge of a signal recording tape, which is free from the afore-mentioned hysteresis in the on-off operation of the switch and permits highly precise on-off operation to be reliably obtained with a slight displacement of the head to a position corresponding to the end track.

The above object of the invention is achieved by a device for detecting the edge of a signal recording tape, which comprises a first tape edge detecting means provided integral with a magnetic head such that it gets out of at least one edge of the magnetic tape when the magnetic tape is brought to a position corresponding to an end track at the afore-mentioned one edge of the tape, a second tape edge detecting means stationarily provided on the side of the tape opposite the first tape edge detecting means such that it can be faced by the first tape edge detecting means, and a tape edge detection signal means coupled to the first and second tape detecting means such as to produce a tape edge detection signal when the first tape edge detecting means is brought to a position to face the second tape edge detecting means.

DETAILED DESCRIPTION OF THE PREFERRED EMBODIMENT

Figure 1:
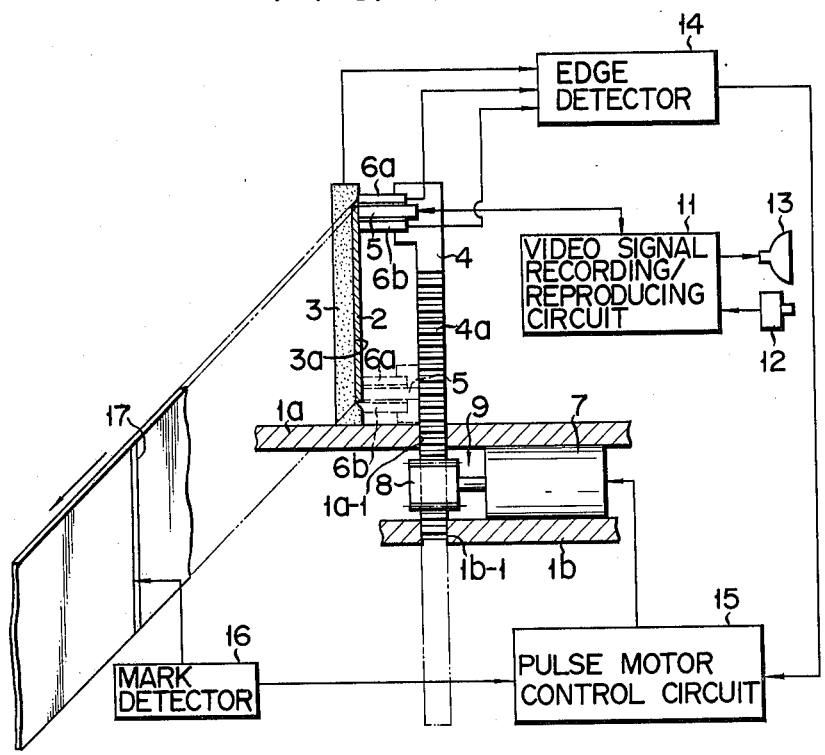
FIG. 1 is a schematic representation of an embodiment of the invention.

Now, an invention will be described in conjunction with an embodiment thereof applied to a stationary head type video type recorder. Referring now to FIG. 1, a stationary member 1a constituting the frame of a stationary head type video tape recorder supports an upright conductive tape guide member 3 made of a metal for guiding an endless tape 2. The tape guide member 3 is formed with a tape guide groove 3a, with the width and depth thereof being respectively equal to the width and thickness of the tape 2. The tape 2 has a structure comprising an insulating plastic base film and a non-conductive magnetic layer formed thereon, and it is received in the groove 3a such that the base film is in contact with the wall of the groove 3a.

The stationary member 1a is formed in a portion thereof spaced apart a predetermined distance from the tape guide member 3 with a see-through hole 1a-1, and also another stationary member 1b extending below the stationary member 1a is formed with a see-through hole 1b-1. An operating member 4 penetrates the see-through holes 1a-1 and 1b-1 and extends parallel to the tape guide member 3. The operating member 4 carries at its upper end a magnetic head 5 such that the free end thereof is in contact with the endless tape 2. It also carries a pair of conductive contact members 6a and 6b bonded by an insulating adhesive respectively to the upper and lower sides of the magnetic head 5 such that their free ends are flush with that of the magnetic head 5.

The operating member 4 is formed in its portion other than that holding the magnetic head 5 with a rack 4a, and a pinion gear 8 mounted on a shaft of a pulse motor 7 is in mesh with the rack 4a. The pulse motor 7 is held in position between the stationary members 1a and 1b. The operating member 4 having the rack 4a, pulse motor 7 and pinion gear 8 constitute a head drive mechanism 9.

The magnetic head 5 is connected to an ordinary image signal recording and reproducing circuit 11, to which a television camera 12 and a television receiver set 13 are coupled. In recording, image signals obtained from the television camera 12 are supplied to the magnetic head 5 and magnetically recorded on the endless tape 2. In playback, video signals obtained from the magnetic head 5 are supplied to the television receiver set 13 for image reproduction.

The conductive tape guide member 3 and the paired contact members 6a and 6b are connected to respective input terminals of a tape edge detecting circuit 14. The detecting circuit 14 detects the presence or absence of the electric contact between the tape guide member 3 and contact member 6a or 6b; for example when the contact member 6a is brought into contact with the tape guide member 3, it supplies a command signal for stopping or reversing the pulse motor 7 to a pulse motor control circuit 15. The contact member 6b is brought into contact with the tape guide member 3 when the head 5 is moved to a position shown by broken lines in FIG. 1, and at this time the detecting circuit 14 supplies a command signal for stopping or reversing the pulse motor 7 again, i.e., causing the forward rotation thereof, to the pulse motor control circuit 15.

The pulse motor control circuit 15 supplies to the pulse motor 7 a drive signal for causing the rotation of the pulse motor 7 for a predetermined angle every time it receives an output from a mark detector 16. The mark detector 16 supplies an output signal to the pulse motor control circuit 15 every time it detects an end mark 17 which is formed on the endless tape 2 over the entire width dimension thereof; that is, it produces an output every time the endless tape completes one excursion. The end mark 17 consists of, for instance, an aluminum foil applied to the surface of the endless tape 2. The mark detector 16 may be of any type so long as it produces an electric signal by detecting the aluminum foil; for example, a combination of a lamp for projecting light onto the end mark 17 and a photoelectric converter for detecting light reflected from the end mark 17 may be used.

Figure 2:
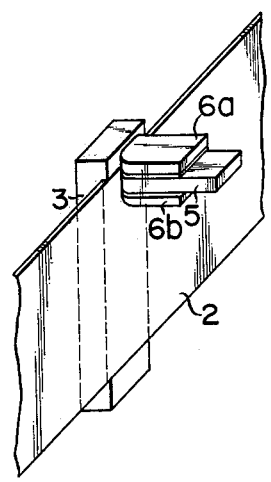
FIG. 2 is a fragmentary enlarged-scale perspective view showing the tape edge detecting device shown in FIG. 1.

The operation of the embodiment shown in FIG. 1 will now be described. It is now assumed that the magnetic head 5 and contact members 6a and 6b are found at the position shown by solid lines in the Figure. FIG. 2 shows this state in a perspective view. In this state, the tape guide member 3 and contact member 6a are in contact with each other, so that a command for stopping or reversing the pulse motor 7 is being sent from the detecting circuit 14 to the pulse motor control circuit 15.

In this state, with the movement of the magnetic tape 2, for instance, in the direction of the arrow shown in FIG. 1, the end mark 17 is detected by the mark detector 16, whereby a mark detection signal is supplied from the detector 16 to the pulse motor control circuit 15. As a result, the rotation of the pulse motor 7 for a predetermined angle is caused by a pulse output from the pulse motor control circuit 15, whereby the operating member 4 is moved downwards through the pinion gear 8 and rack 4a to an extent corresponding to one recording track pitch of the tape 2. Consequently, the tracing by the magnetic head 5 is switched from the uppermost track over to the second uppermost track. If playback is in force at this time, the magnetic head 5 is functioning as reproducing head, and image reproduction is being displayed on the television receiver set 13.

Subsequently, every time the detector 16 detects the end mark 17, the magnetic head 5 is lowered again to the extent corresponding to one recording track pitch. At this time, the contact members 6a and 6b are both insulated from the tape guide member 3 by the magnetic tape 2. When the magnetic head 5 is lowered to its position shown by the broken lines in FIG. 1, the lower edge of the tape guide member 3 is contacted by the other contact member 6b, whereupon the detecting circuit 14 supplies a command for causing the stoppage or the forward rotation of the pulse motor 7 to the pulse motor control circuit 15. Subsequently, every time the mark detector 16 detects the end mark 17, the head 5 is upwardly moved by one track pitch with the reverse rotation of the pulse motor 7.

While in the above embodiment the tape guide member 3 is wholly made of a conductive material, it need be conductive only in its portions to be contacted by the contact members 6a and 6b. In order to ensure the contact between the contact members 6a and 6b and the corresponding edges of the tape guide member 3, it is effective to make the tape guide member 3 from an elastic conductive material such as conductive rubber and form the tape guide groove 3a such that the depth thereof is slightly greater than the thickness of the tape 2.

Figure 3A:
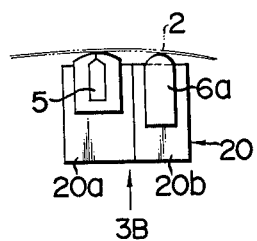
FIGS. 3A and 3B are respectively a plan view and a side view showing a modification of a support portion supporting a magnetic head and contact members shown in FIGS. 1 and 2.
Figure 3B:
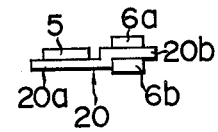

In the embodiment shown in FIGS. 1 and 2, the contact members 6a and 6b are respectively bonded to the upper and lower sides of the magnetic head 5. FIGS. 3A and 3B show respectively in a plan view and in a side view another embodiment of the invention. In these Figures, a support plate 20 is secured at its rear end to a head support portion of an operating member similar to that shown in FIG. 1. It is disposed such that its front end is located in the close proximity of the magnetic tape 2, and it supports a magnetic head 5 mounted on its head support portion 20a. It has a contact member support portion 20b, which is stepped with respect to its rest as shown in FIG. 3B. The upper surface of the contact member support portion 20b is substantially flush with the upper surface of the head 5, and the lower surface of the portion 20b is substantially flush with the lower surface of the head 5. The contact member support portion 20b supports a pair of contact members 6a and 6b respectively bonded by an insulating adhesive to its upper and lower surfaces. With this construction of the magnetic head and tape edge detecting mechanism, the same effects as mentioned earlier can be obtained.

In the embodiment of FIG. 1, the contact members 6a and 6b used for detecting the tape edge while using the mark detector 16 for detecting the end mark 17. In this case, since the end mark 17 consists of aluminum foil and thus conductive, the contact members 6a and 6b are short-circuited to each other for every excursion of the endless tape 2 so long as the head 5 is found at a position other than the tape edge. Thus, it is possible to dispense with the mark detector 16 by making use of the aforementioned short-circuit for the detection of the mark.

Further embodiments of the invention will now be described with reference to FIGS. 4 to 7A and 7B. In these Figures, like parts at those in FIG. 1 are designated by like reference numerals.

Figure 4:
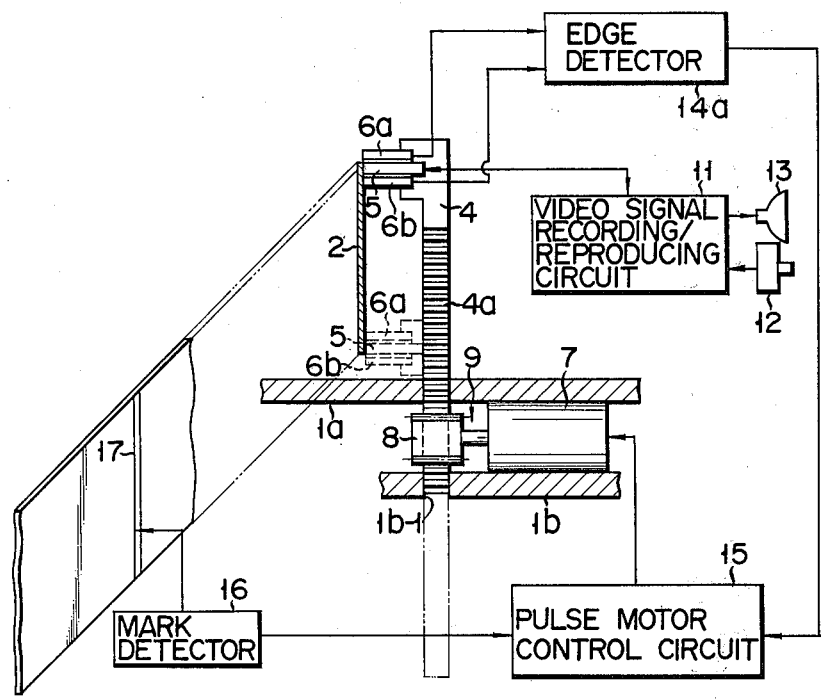
FIG. 4 is a schematic representation of a further embodiment of the inventon.

In the embodiment shown in FIG. 4, endless tape 2 is stretched by a tape stretching means (not shown) such that it is driven in contact with magnetic head 5. In this case, the endless tape 2 is conductive at least on its side in contact with the magnetic head 5. For instance, an endless tape, whose magnetic layer is formed from a conductive magnetic material, may be used. While the magnetic head 5 does not reach the tape edge, i.e., the recording track at the edge, contact members 6a and 6b which are bonded by an insulating adhesive on the respective upper and lower surfaces of the magnetic head 5 are held short-circuited by the conductive magnetic tape 5, so that no output is supplied from detecting circuit 14a to a pulse motor control circuit 15.

When the magnetic head 5 and contact members 6a and 6b are brought to the position shown by solid lines in FIG. 4, the head 5 begins to trace the track at one edge of the tape 2. At this time, the contact member 6a is detached from the magnetic tape 5, that is, the short-circuit between the contact members 6a and 6b is released, so that a command for causing the stoppage or the reverse rotation of the pulse motor 7 is supplied from the detecting circuit 14a to the pulse motor control circuit 15. When a mark detector 16 detects an end mark 17 in this state, a drive pulse is supplied from the pulse motor control circuit 15 to the pulse motor 7, thus causing the magnetic head 5 to be moved downwards for one track pitch so that it may trace the second track.

When the magnetic head 5 is moved down to its position shown by broken lines in FIG. 4, the other contact member 6b gets out of contact with the magnetic tape 5, that is, the short-circuit between the contact members 6a and 6b is again released, so that this time a command for causing forward rotation of the pulse motor 7 is supplied. Thus, when the end mark 17 is subsequently detected, the head 5 is moved upwards by one track pitch.

The conductivity of the magnetic layer of the endless tape 2 varies with the state of attachment of granular magnetic material to the base film, and it is known that a magnetic layer which is formed by vacuum deposition or spattering without using any binder shows conductivity. In this case, the conductivity may be obtained with an oxidized metal or a non-oxidized metal as the magnetic material.

The embodiment of FIG. 4 may again be modified by adopting the construction of the magnetic head 5 and contact members 6a and 6b as shown in FIGS. 3A and 3B. Also, since the contact members 6a and 6b are normally held short-circuited by the magnetic layer, by forming the end mark 17 with an electrically insulating material the short-circuit state between the contact members 6a and 6b may be momentarily released when the end mark 17 comes to the contact members, so that the mark can be detected. In this case, the mark detector 16 can thus be dispensed with.

While in the above embodiments the electric contact of the contact members 6a and 6b with the tape guide member 3 or the electric short-circuit between the contact members 6a and 6b is made use of for detecting the tape edge, this is by no means limitative, and it is possible to detect the tape edge, for instance, by an optical means.

Figure 5:
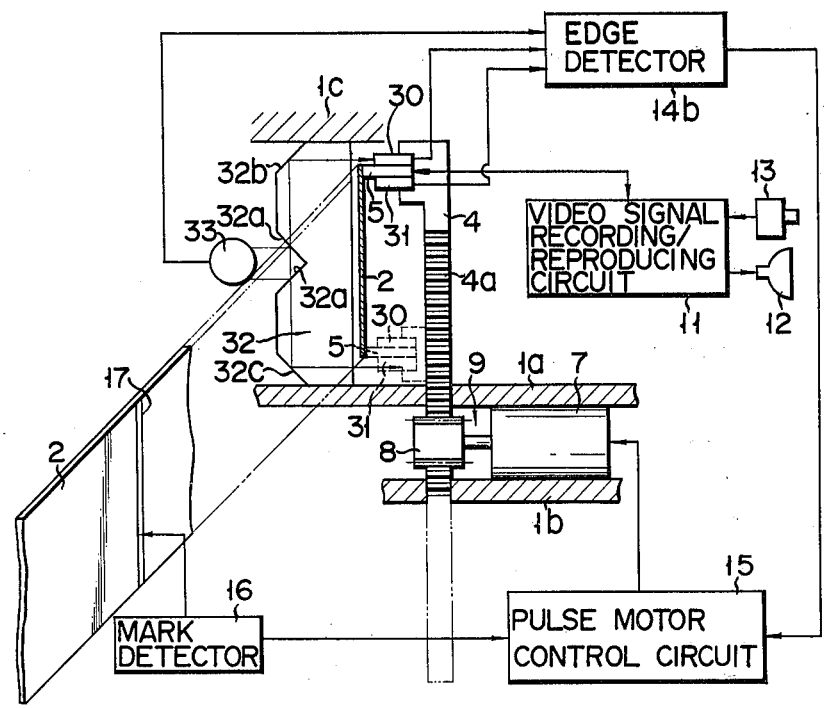
FIG. 5 is a schematic representation of a still further embodiment of the invention.

FIGS. 5 to 7B show further embodiments, in which an optical detecting means is used. Referring to FIG. 5, magnetic head 5 is mounted on operating member 4 such that it is in contact with the magnetic layer of endless tape 2, and photo-cells 30 and 31 are bonded to the respective upper and lower surfaces of the magnetic head 5. A photo-conductor 32 is disposed on the side of the tape 2 opposite the photo-cells 30 and 31. It is held in position between stationary members 1a and 1c, and it has a shape as clearly shown in FIG. 6. It has a width dimension greater than the width of the tape 2. It is formed on one side with a pair of light receiving surfaces 32a terminating in each other and also a pair of light reflecting surfaces 32b and 32c individually corresponding to the respective light receiving surfaces 32a. It is made of a transparent acrylic synthetic resin or glass. A light source 33 such as a light-emitting diode, a lamp, etc. is disposed to face the juncture between the light receiving surfaces 32a, and light from the light source 33 is projected onto the light receiving surfaces 32a, reflected by the light reflecting surfaces 32b and 32c and projected from positions of the photo-conductor 32 slightly spaced apart from the upper and lower edges of the tape 2 toward the corresponding side thereof.

Figure 6:
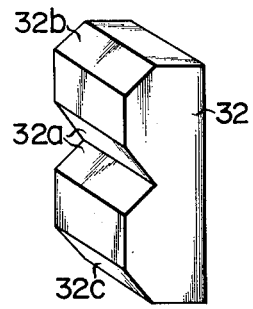
FIG. 6 is an enlarged-scale perspective view of a photo-conductor shown in FIG. 5.

In the tape edge detecting device shown in FIGS. 5 and 6, when the magnetic head 5 is brought to the uppermost track in the tape 2, the photo-cell 30 gets out of the upper edge of the tape 2. As a result, a light receiving surface of the photo-cell 30 receives light coupled thereto from the light source 33 after reflection by the light reflecting surface 32b, so that a photoelectric conversion signal is supplied from the photo-cell 30 to a tape edge detector 14b. Thus, a detection signal is supplied from the detector 14b to pulse motor control circuit 15, which thus produces a command signal for stopping the head 5 or causing reverse rotation of the pulse motor 7. When the magnetic head 5 is brought to a tape lower edge detection position as shown by broken lines in FIG. 5, the other photo-cell 31 receives light coupled from the light reflecting surface 32c, so that a detection signal is supplied from the photo-cell 31 to the tape edge detector 14b.

Figure 7A:
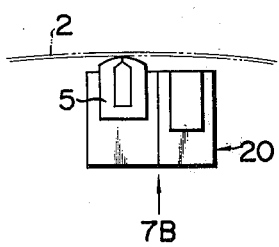
FIGS. 7A and 7B are respectively a plan view and a side view showing a modification of a support portion supporting a magnetic head and contact members shown in FIGS. 1 and 2.
Figure 7B:
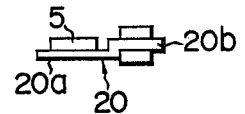

While in the embodiment of FIG. 5 the photo-cells 30 and 31 are directly bonded to the upper and lower surfaces of the head 5, it is also possible to mount the photo-cells 30 and 31 on the upper and lower surfaces of a support member 20, to which the head 5 is also secured on one side of the photo-cells 30 and 31, as shown in FIGS. 7A and 7B. Also, the afore-mentioned prism-shaped photo-conductor 32 may be replaced with an optical fiber unit having a light receiving surface facing the light source 33 and light projecting surfaces to be faced by the respective photo-cells 30 and 31. Further, it is possible to omit the photo-conductor and provide two light sources at positions corresponding to the upper and lower edges of the tape 2. Further, it is possible to interchange the positions of the light source and photo-cells by using a light source, which is moved in unison with the head 5. Further, it is possible to use a light blocking member, which is moved in unison with the head 5 and blocks, when it gets out of the edge of the tape 2, the light path from a light source to a photo-cell, thus detecting the tape edge. Further, as the non-contact type tape edge detecting means it is possible, in addition to the afore-mentioned combination of a light source or light sources and photo-cells, magnetism sensing elements which can be operated with a magnetic field of such intensity as not to have adverse effects the recording tracks.

What is claimed is:

1. A device for detecting the edge of a magnetic tape for recording signals, comprising: first means provided integral with a magnetic head and arranged such that it extends beyond at least one edge of the magnetic tape when the magnetic head is brought to a position corresponding to an end track adjacent to said one edge of the tape, second means stationarily provided on the side of the tape opposite said first means such that it can be faced by said first means when the latter extends beyond said at least one edge, and tape edge detection signal generating means coupled to said first and second means such as to produce a tape edge detection signal when said first means is brought to a position facing said second means.

2. A detecting device according to claim 1, wherein said magnetic tape has a non-conductive magnetic layer, said first means is a movable conductive contact member, and said second means has a protruding portion capable of being contacted by said movable contact member, said second means being conductive at least in said protruding portion.

3. A detecting device according to claim 2, wherein said first means includes an operating member capable of being moved by a pulse motor and first and second movable contact members integral with a magnetic head mounted on said operating member, and said second means has a tape guide groove and first and second protruding portions formed on opposite sides of said tape guide groove, the depth and width of said tape guide groove being substantially equal respectively to the thickness and width of said magnetic tape.

4. A detecting device according to claim 3, wherein said first and second movable contact members are bonded by an insulating adhesive respectively to the upper and lower surfaces of said magnetic head.

5. A detecting device according to claim 3, wherein said magnetic head is mounted on a support member mounted on said operating member, and said first and second movable contact members are mounted respectively on the upper and lower surfaces of said supporting member and on one side of said magnetic head.

6. A detecting device according to claim 3, wherein said operating member has a rack portion in mesh with a pinion gear rotatable by said pulse motor.

7. A detecting device according to claim 1, wherein said first means is a pair of photo-electric converting elements, and said second means is a means for projecting light to said photo-electric converting elements past the vicinity of the tape edges.

8. A detecting device according to claim 7, wherein said light projecting means includes a light source and a photo-conductor for splitting light from said light source into two light beams and projecting said light beams to said photoelectric converting elements past the upper and lower edges of said tape.

9. A detecting device according to claim 1, wherein the magnetic tape is provided with an end mark to be detected by said first means.

10. A device for detecting the edge of a conductive magnetic tape for recording signals, comprising: a magnetic head, first and second contact members provided integrally on said magnetic head such that at least one of said contact members extends beyond at least one edge of said magnetic tape when said magnetic head is brought to a position corresponding to an end track adjacent one edge of said magnetic tape, said first and second contact members normally being in contact with and held short-circuited to each other by said conductive magnetic tape, and tape edge detection signal generating means coupled to said first and second contact members such as to produce a tape edge detection signal when one of said contact members is out of contact with said tape.

* * * * *